(12) United States Patent
Willham et al.

(10) Patent No.: US 7,940,459 B2
(45) Date of Patent: May 10, 2011

(54) FORMABLE FUSED POLYMER PANELS CONTAINING LIGHT REFRACTING FILMS

(75) Inventors: John E. C. Willham, Sandy, UT (US); Wendy E. K. Langan, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 0 days.

(21) Appl. No.: 12/064,936

(22) PCT Filed: Feb. 25, 2008

(86) PCT No.: PCT/US2008/054854
§ 371 (c)(1),
(2), (4) Date: Feb. 26, 2008

(87) PCT Pub. No.: WO2008/106389
PCT Pub. Date: Sep. 4, 2008

(65) Prior Publication Data
US 2010/0265581 A1    Oct. 21, 2010

Related U.S. Application Data (60) Provisional application No. 60/891,717, filed on Feb. 26, 2007.

(51) Int. Cl.
*G02B 1/10* (2006.01)
(52) U.S. Cl. .......................................... 359/582; 359/589
(58) Field of Classification Search .................. 359/589, 359/582
See application file for complete search history.

(56) References Cited

U.S. PATENT DOCUMENTS

| | | | | |
|---|---|---|---|---|
| 4,939,009 A | * | 7/1990 | Beavers et al. ............. | 428/35.2 |
| 5,178,800 A | * | 1/1993 | Blum ........................... | 264/1.38 |
| 5,643,666 A | | 7/1997 | Eckart et al. | |
| 5,805,336 A | * | 9/1998 | Dalzell et al. ............... | 359/494 |
| 5,894,048 A | | 4/1999 | Eckart et al. | |
| 5,958,539 A | | 9/1999 | Eckart et al. | |
| 5,998,028 A | | 12/1999 | Eckart et al. | |
| 6,025,069 A | * | 2/2000 | Eckart et al. ................ | 428/339 |
| 6,106,665 A | | 8/2000 | Wood et al. | |

(Continued)

OTHER PUBLICATIONS

"Acrylite Radiant," www.cyro.com, CYRO Industries, Parsippany, New Jersey 07054, [online] [retrieved on Feb. 29, 2008], 2 pgs. Retrieved from the Internet: http://www.methacrylates.de/methacrylates/MCMSBase/Pages/ProvideResource.aspx?respath=/NR/rdonlyres/B273D41D-202F-4792-B31E-13C76228C3C2/0/3127ARadiantsheetTB.pdf.

(Continued)

*Primary Examiner* — Joshua L Pritchett
(74) *Attorney, Agent, or Firm* — Workman Nydegger (57) ABSTRACT

A dichroic, light refracting resin panel comprises one or more dichroic/refracting films that have been embedded and/or laminated between a plurality of resin substrates, such as copolyester, polycarbonate, and/or acrylic substrates. The dichroic resin panel can be manufactured with a variety of different materials, and with autoclave or hot press methods in a manner that ensures structural and aesthetic integrity. Specifically, a dichroic resin panel in accordance with the present invention can be created in such a way as to avoid delamination despite a variety of end-uses and formations (e.g., curved panel, embossed/textured surfaces). In addition, the dichroic resin panels can be handled, transported, and installed in a variety of exterior or interior applications, even where certain building code requirements may be relatively stringent. The dichroic resin panels can be used in a variety of structural and/or aesthetic applications.

20 Claims, 3 Drawing Sheets

U.S. PATENT DOCUMENTS

| | | | | |
|---|---|---|---|---|
| 6,500,295 B1 * | 12/2002 | Kubota | | 156/269 |
| 6,562,163 B1 | 5/2003 | Wellington | | |
| 6,746,631 B2 * | 6/2004 | Gettens | | 264/1.32 |
| 6,780,275 B2 | 8/2004 | Wellington | | |
| 7,036,932 B2 * | 5/2006 | Boulineau et al. | | 351/163 |
| 2006/0028730 A1 * | 2/2006 | Varaprasad et al. | | 359/604 |
| 2007/0154694 A1 * | 7/2007 | Samuels et al. | | 428/216 |

OTHER PUBLICATIONS

"Radiant," www.cyro.com, CYRO Industries, Parsippany, New Jersey 07054, [online] [retrieved on Feb. 29, 2008], 1 pg. Retrieved from the Internet: http://www.cyro.com/Internet/SiteContent.nsf/88E13EAACAD0A87185256D57004F94D4/$File/3125+A+Radiant+sell+sheet.pdf?OpenElement.

* cited by examiner

FORMABLE FUSED POLYMER PANELS CONTAINING LIGHT REFRACTING FILMS

CROSS-REFERENCE TO RELATED APPLICATIONS

The present invention is a U.S. National Stage Application corresponding to PCT Application No. PCT/US08/54854, filed on Feb. 25, 2008, entitled "FORMABLE FUSED POLYMER PANELS CONTAINING LIGHT REFRACTING FILMS," which claims the benefit of priority to U.S. Provisional Patent Application No. 60/891,717, filed on Feb. 26, 2007, also entitled "FORMABLE FUSED POLYMER PANELS CONTAINING LIGHT REFRACTING FILMS." The entire content of each of the aforementioned patent applications is incorporated herein by reference.

BACKGROUND OF THE INVENTION

1. The Field of the Invention

Implementations of the present invention relate generally to systems, apparatus, and methods for creating formable panels with light refraction properties.

2. Background and Relevant Art

Dichroism generally refers to a property in which an object absorbs or filters one of two plane-polarized components of transmitted light more strongly than the other, as well as, or, in the alternative, when an object differentially reflects or transmits light. Objects that have these types of properties, or can otherwise create this these types of effects, are referred to as being "dichroic." In the field of architectural design, there has been some recent interest in panels that exhibit dichroic properties (i.e., "dichroic panels") due to any number of both aesthetic and functional reasons (or both). To create a dichroic panel, a manufacturer will typically attach one or more light refracting films (or "dichroic films") to a transparent or translucent substrate, such as a translucent or transparent glass or acrylic panel. The manufacturer can then use the dichroic panel as a window, wall, door, partition, or even as a treatment to existing structure. Unfortunately, present methods for manufacturing dichroic panels suffer from a number of disadvantages, and often lead to products with relatively poor quality.

For example, one conventional example of creating dichroic panels include those related to dichroic glass panels. In this case, a manufacturer will typically create a dichroic glass panel by nesting a dichroic film between two outer glass substrates (glass panels/sheets), and two bonding film layers (or "tie layers"). The tie layers are typically comprised of thermoplastic polyurethane (TPU), ethylene vinyl acetate (EVA), or polyvinyl butyral (PVB). In another example, a manufacturer may deposit a dichroic metallized layer or coating on the surface of a glass substrate. In this additional example, however, the dichroic surface of the glass sheet is unprotected, and the available sizes are quite limited. In addition, glass substrates generally tend to be fairly difficult to work with. For example, the density of typical glass panels can result in a substantial amount of hardware and equipment not only to handle the glass during preparation and fabrication, but also to support the weight of the finished panel during installation. In addition, it is difficult and/or expensive to add additional finishes to glass panels, such as embosses or textures. This is particularly the case with large glass panels (e.g., greater than a few feet in any dimension). For at least these and other reasons, dichroic glass panels tend to be relatively high cost.

Along these lines, the fragility and brittleness of glass panels make the use of dichroic glass panels quite limited. Although lamination of dichroic films in glass can reduce the propensity of the glass panel to shatter, lamination does not eliminate the chance that the glass lites may become cracked or spalled in the event of impact. Further, the brittle nature of laminated glass creates difficulty in fabrication, and tends to impose limitations to the extent that most fabrication of the laminated panels typically needs to be performed in a glass shop, rather than onsite at the point of installation. Specifically, it is nearly impossible to form glass panels into other shapes after processing them to create the dichroic panels. Attempts to reform dichroic glass panels, particularly without the appropriate processing equipment, would either ruin/break the glass substrates, or ruin the dichroic film/coating, or both. Although one could prepare such dichroic glass panels onsite, the necessary glass processing equipment are cumbersome, and bringing such glass processing onsite is typically not a viable option.

Additional conventional mechanisms for creating dichroic panels involve the use of substrates other than glass, such as acrylic materials. For example, one conventional dichroic acrylic panel comprises a dichroic film that is adhered to a single outer surface of an extruded acrylic sheet. Such a panel can offer a unique aesthetic, but tends to be limited in its application of use due to the dichroic film being positioned on the outer surface. In particular, the positioning of the dichroic film on the outer surface leaves the dichroic film susceptible to scratching, marring or contamination that can be unsightly. In addition, both the dichroic film and substrate can contribute to other types of problems with this kind of dichroic panel.

For example, conventional light refracting/dichroic films, which typically comprise a combination of several different ultra-thin substrate films formed together, tend not to be UV-stable. Specifically, one of the underlying substrate films used to create conventional dichroic films comprises a non-UV-stabilized polyester. Due to lack of UV-stability in the light refracting films, therefore, dichroic panels comprising dichroic film attached to an outside surface of an acrylic substrate cannot ordinarily be used in exteriors without adversely affecting the dichroic surface. Furthermore, acrylic itself tends to have relatively poor flammability performance, and local building codes often prohibit use of acrylic and other flame-propagating materials to be installed as interior finish applications. Still further, the acrylic and dichroic film combination as described above tends to produce a mirror-like reflectance, which, in context with bright lights or daylight, can have a blinding effect on an observer.

Notwithstanding such disadvantages, there are other conventional examples of acrylic in which the manufacturer alternatively positions the dichroic film between two acrylic substrates, much like with the aforementioned glass example. In this case, however, the manufacturer encapsulates a dichroic film interlayer within opposing acrylic sheet substrates using a liquid contact adhesive therebetween (rather than a bonding film or tie layer). On one hand, using a liquid contact adhesive to adhere the acrylic substrates and dichroic film can aid in reducing the cost of manufacturing process (i.e., no lamination or heat/pressure apparatus needed). There are a number of different disadvantages to using liquid adhesives, however.

For example, at least one disadvantage is that the liquid adhesive tends to distort the dichroic interlayer, at least in part since it can be difficult to remove air bubbles trapped in the liquid adhesive, and between the dichroic film and acrylic substrate(s). These and other imperfections caused by the liquid adhesive have a tendency to hinder the intended aesthetic properties of the panel, thereby limiting the panel to use in relatively low-end applications. At least another disadvantage is that such a panel will have little or no post-manufacturing formability (i.e., limited to the shape of the initial acrylic substrates). Specifically, the use of liquid/contact adhesives tends to limit the amount of bending and forming that the resulting panel can endure without delaminating. In addition, and as previously described, the use of acrylic panels means that the resultant panel cannot ordinarily be used as a building material under typical building codes that employ flammability constraints.

Although there are conventional lamination processes that apply heat and pressure (and thus do not use a liquid adhesive) with resin substrates on other types of panels, these types of processes are not readily applicable to dichroic acrylic or glass panels. Specifically, the temperatures and pressures in most conventional lamination processes are quite high (e.g., 300° F. or higher). In such processes, these higher temperatures (often accompanied with high pressures of 100 psi or greater) are used to melt the substrates to each other, and/or to some decorative interlayer. Such high temperatures and pressures, however, will tend to wrinkle, tear, or damage the dichroic film, or damage or crack the acrylic or glass substrates whether laminated to an outside surface or positioned between two acrylic or glass substrates. This tends to be particularly true when using substrates to which textures or embossing have already been applied prior to the lamination process. One will appreciate that this would make such a resulting panel unacceptable for use in most architectural design applications, where both structure and aesthetics considerations are important.

BRIEF SUMMARY OF THE INVENTION

Implementations of the present invention solve one or more problems in the art with systems, methods, and apparatus configured to provide dichroic resin panels that are formable into a variety of different structures, and maintain an intended dichroic aesthetic both during and after formation over time. In at least one implementation, for example, a dichroic resin panel comprises one or more dichroic films that have been laminated between a plurality of opposed resin substrate sheets using a specially-selected combination of heat and pressure in a lamination process. In one implementation, the dichroic resin panel also comprises one or more tie layer films (e.g., TPU) used between the dichroic film(s) and resin substrates during lamination, which helps adhere the various layers at lower temperatures without distorting any intended aesthetic qualities. The resulting dichroic resin panel has good formability (e.g., reshaping without delamination or dichroic film destruction), and can be used for both structural and/or architectural projects that also have rigid flammability standards.

For example, a dichroic resin panel in accordance with an implementation of the present invention can include a substantially translucent first resin substrate layer. The dichroic resin panel can also include a substantially translucent second resin substrate layer that registers (e.g., corresponds dimensionally) with the first resin layer. In addition, the dichroic resin panel can include one or more light refracting film layers laminated between the first and second resin layers. The light refracting film is embedded between the first and second resin layers without material defect. In addition, the combination of these materials in the resulting end product is at least partially malleable after a lamination process.

In addition, a method of manufacturing a post-formable, dichroic resin panel in accordance with an implementation of the present invention can include preparing a dichroic laminate assembly that includes one or more light refracting films and one or more tie layers interposed between a plurality of resin substrates. The method can also include heating the dichroic laminate assembly in a lamination apparatus to a laminating temperature, such as a temperature of no more than about 250° F. to about 260° F. Here, the one or more tie layers will then soften or melt between the plurality of resin substrates. In addition, the method can include cooling the dichroic laminate assembly. In this case, the dichroic laminate assembly comprises a substantially unitary resin panel. Furthermore, the method can involve removing the unitary resin panel from the lamination apparatus.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention provides systems, methods, and apparatus configured to provide dichroic resin panels that are formable into a variety of different structures, and maintain an intended dichroic aesthetic both during and after formation over time. In at least one implementation, for example, a dichroic resin panel comprises one or more dichroic films that have been laminated between a plurality of opposed resin substrate sheets using a specially-selected combination of heat and pressure in a lamination process. In one implementation, the dichroic resin panel also comprises one or more tie layer films (e.g., TPU) used between the dichroic film(s) and resin substrates during lamination, which helps adhere the various layers at lower temperatures without distorting any intended aesthetic qualities. The resulting dichroic resin panel has good formability (e.g., reshaping without delamination or dichroic film destruction), and can be used for both structural and/or architectural projects that also have rigid flammability standards.

As understood more fully herein, dichroic resin panels in accordance with the present invention can be produced using any number of polymeric resin (or "resins") substrate materials. In general, such resin substrate materials can include resin sheets comprising any number or combination of copolyesters (e.g., PETG, PET, PCTG), etc., poly-methyl methacrylates (PMMA, or "acrylic"), polycarbonate, styrene, polyvinyl chloride (PVC), polyurethanes, or mixtures thereof. These materials, when manufactured in accordance with the materials and processes described herein, result in dichroic, polymeric resin panels that are ductile and lightweight. In addition, these materials provide the resulting dichroic resin panels with benefits of impact resistance, flammability, and weatherability, particularly as compared with conventional counterparts. For example, copolyesters such as PETG, and polycarbonate material, tend to be much less flammable than acrylic counterparts, though still sufficiently structural for use as a building material. Furthermore, copolyesters and polycarbonates can also be configured in a wide variety of ways with relative ease to have enhanced fire resistance.

Furthermore, the materials and processes described herein result in panels that can be fabricated and machined with basic fabrication tools, even such as those suitable for working with wood. Still further, the materials and processes described herein provide a manufacturer with the ability to manipulate and control reflection qualities of a given dichroic panel, such as to minimize undesirable reflection while still providing a dichroic effect. Yet still further, the materials and processes described herein allow a manufacturer to create dichroic resin panels that have curves, and that can be finished with deep embossing and/or textures.

As a preliminary matter, frequent reference is made herein commonly to dichroic "resin" panels. One will appreciate after reading the following specification and claims, however, that implementations of the present invention can also be applied to other substrate materials, such as glass substrates used in the panels, to thus create inventive dichroic "glass" panels that still represent an advantage in the art. In at least one implementation, for example, a manufacturer can substitute glass substrates in place of resin substrates, such as when preparing the dichroic panel assembly for use in the autoclave method described herein. In particular, implementations of the present invention provide advantageous manufacturing methods for virtually any dichroic panel of virtually any substrate, where the resulting panel that can be used in a wide range of environments, and is generally superior to comparable conventional dichroic panels.

Figure 1A:
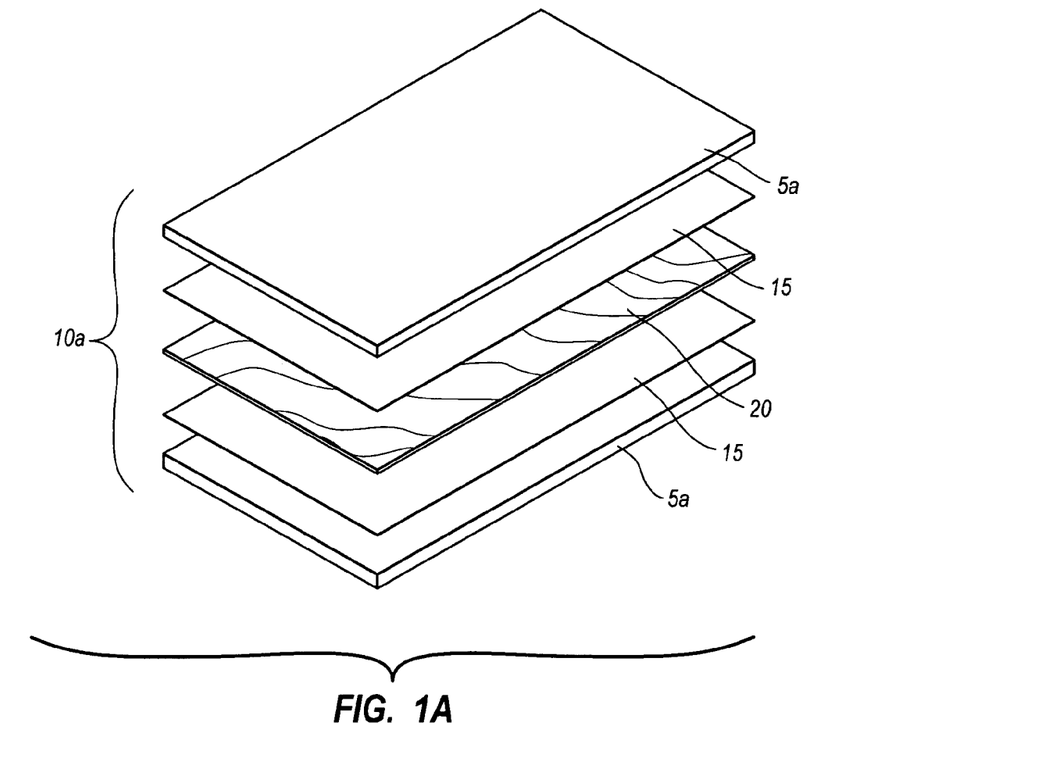
FIG. 1A illustrates a schematic diagram of a dichroic laminate assembly in accordance with an implementation of the present invention.

FIG. 1A illustrates a schematic diagram of a laminate assembly 10a that has been prepared in accordance with an implementation of the present invention. As shown, a laminate assembly 10(a/b) can comprise at least one dichroic film 20 that has been positioned between a plurality of resin substrates 5(a/b). As previously mentioned, the resin substrate can comprise copolyester, acrylic (PMMA), or polycarbonate base layers, with acrylic (PMMA) and polycarbonate being preferred, and copolyester being most preferred. In at least one implementation, the resin substrates 5(a/b) can also be substituted in whole or in part with comparable glass substrates. In any event, the thickness of any single base layer/ substrate 5a can range from about 0.030" to about 5.0", preferably about 0.060" to about 2.0".

FIG. 1A also shows that the laminate assembly 10(a) can comprise one or more "tie layers" 15 used to bond the substrate layers to the dichroic film and/or to another substrate. In one implementation, a tie layer 15 can comprise materials such as ethyl-vinyl acetate (EVA), ethylene-methyl acrylate (EMA), or thermoplastic polyurethane (TPU). In at least one implementation, TPU is the preferred material for tie layer 15, at least in part since TPU is a self-priming, polyether based, low modulus aliphatic substance that is particularly suited for one or more of the results described herein (e.g., bond/lamination strength, and flexibility during additional forming). In general, the tie layer 15 thickness will be several microns thick, and can range from about 0.005" to 0.125", preferably 0.010" to 0.060". Of course, one will appreciate that the manufacturer can choose any particular tie layer material based on bond strength of the resulting dichroic resin panel, and that tie layers other than TPU may be preferred for certain applications.

Figure 2A:
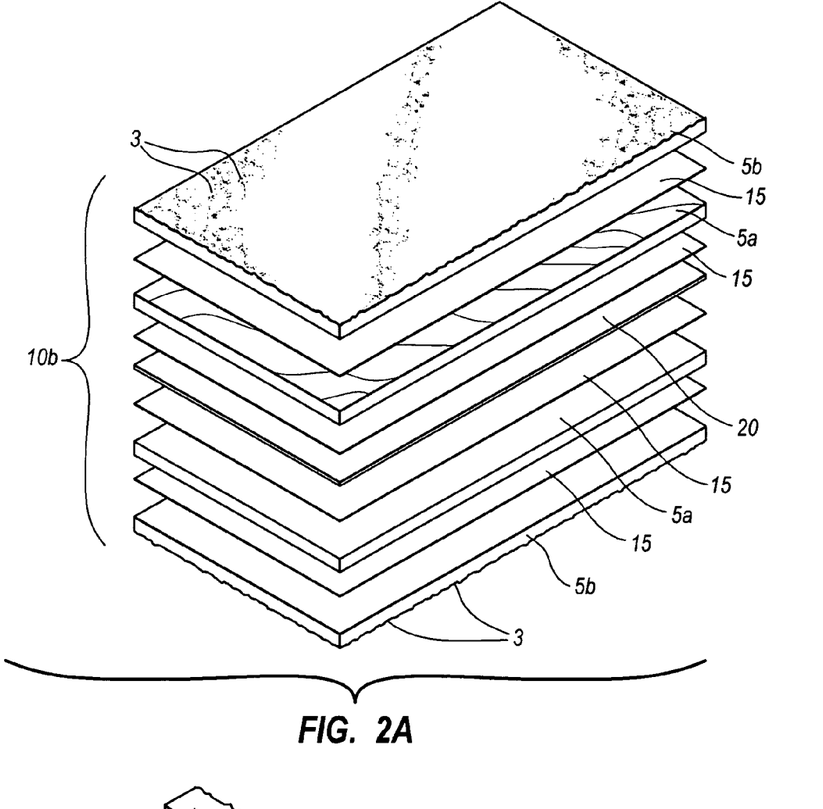
FIG. 2A illustrates a schematic diagram of a dichroic laminate assembly in accordance with another implementation of the present invention, in which one or more of the substrates are embossed or textured.

By contrast, FIG. 2A illustrates an alternate implementation of laminate assembly 10, designated as 10b. As discussed more fully herein, laminate assembly 10b is configured more particularly for use with textured or embossed surfaces (i.e., previously textured or embossed surfaces). For example, FIG. 2A shows that laminate assembly 10b comprises essentially the same materials (and ordering) as shown in FIG. 1A, albeit differing with respect to substrates 5. In particular, FIG. 2A shows that the outer substrate layers of laminate assembly 10b comprise textured/embossed substrates 5b, and that laminate assembly 10b further comprises one or more non-textured/non-embossed resin substrates 5a positioned therebetween about the dichroic film 20. One will appreciate that there can be any number of reasons for using the multiple resin substrates 5(a/b) as shown in FIG. 2A, and that, depending on the number of resin substrates used, the manufacturer may want to use thinner or thicker sizes of resin substrates 5(a/b) to effect a particular size in the resulting end product (e.g., panels 25(a/b)).

Figure 1B:
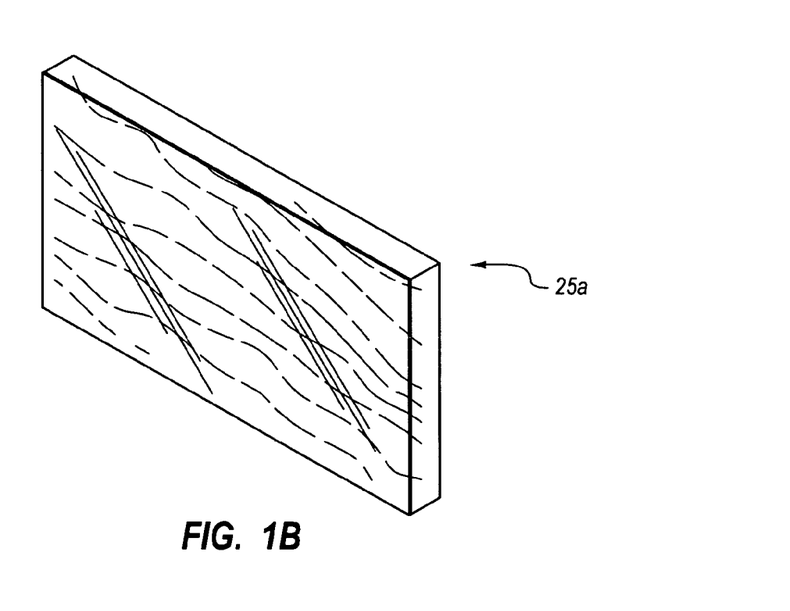
FIG. 1B illustrates a schematic diagram of a formed, dichroic resin panel using the laminate assembly of FIG. 1A.

In any event, both FIGS. 1A and 1B illustrate use of a light refracting film layer (referred to herein as "dichroic film layer 20"), which is positioned in approximately the center position between at least two resin layers. In general, the dichroic film 20 comprises a reflective, non-image bearing light refracting film having a high thermal stability, and low shrinkage characteristics. In at least one implementation, the dichroic film 20 layer comprises a plurality of resin sheets that are only a few microns thick, and that have been previously bonded together (to create light refracting/dichroic film composite) before being inserted into the laminate assembly. FIG. 1A also shows that dichroic film 20 can be positioned between opposing resin substrates 5a, while FIG. 2A shows that dichroic film 20 can be positioned between opposing resin substrates 5a and 5b.

Furthermore, FIGS. 1A and 1B both show that each layer in the given laminate assembly 5a-b can be positioned to be approximately centered with respect to the next adjacent layer (e.g., 5, 15). Such specific centering between layers (or with respect to a particular adjacent surface), however, is not necessarily required. Rather, the dichroic film 20 need only be between the resin substrates 5(a/b), and not positioned on an outer surface of an outer substrate (e.g., 5a/10a; 5b/10b). Furthermore, a manufacturer can position multiple such dichroic film 20 layers throughout the given laminate assembly 10, though only one dichroic film layer in either assembly 10a or 10b is shown herein for purposes of convenience.

In addition, the dimensions of each layer in the given laminate assembly 10 need not necessarily match in terms of length/width from one layer to the next (such as illustrated). In at least one implementation, for example, a manufacturer can use a dichroic film 20 layer that is oversized between about 0.5"-6" at the edges compared with an adjacent substrate layer (e.g., 5*a*/5*b*), preferably about 1"-2" oversized at the edges. In at least one implementation, this allows the dichroic film 20 to hang over the edges of any substrate 5(*a/b*) and/or bonding/tie layer (15). At least one reason a manufacturer may want to use an oversized dichroic film layer in this manner is to aid in the removal of air that might otherwise be caught between substrates 5(*a/b*) during the lamination processes.

In any event, upon preparing the given laminate assembly 10(*a/b*), the manufacturer can then subject the laminate assembly to any number of different lamination processes. In one implementation, for example, the manufacturer forms the resin panel end product using a lamination apparatus such as a conventional hot press (not shown), using specifically selected temperatures and pressures that are optimized for melting or softening the given tie layer (causing adhesion) 15 without damaging the dichroic film 20 and/or resin substrates 5. In an additional or alternative implementations, however, the manufacturer forms the resin panel end product using a lamination apparatus such as an autoclave (not shown), again using temperatures and pressures that are optimized for melting or softening the tie layer 15 (to cause adhesion). Of course, one will appreciate that a manufacturer can use either type of laminating apparatus (i.e., the hot press or autoclave) for any number of reasons within the scope of the present invention, and obtain a superior dichroic resin panel (25*a-b*).

Although the manufacturer can use either method, one will appreciate that an autoclave-involved method generally allows a manufacturer to form a resulting dichroic resin panel product (i.e., cause lamination between the layers) at lower temperature and pressures. In general, the comparatively lower temperatures and pressures during lamination will tend to minimize potential damage to surface finishes on a given substrate (e.g., 3, 5*b*), and/or minimize damage to the dichroic film 20. The lower temperatures and pressures can also minimize the stresses in the adhesion between substrates 5 and dichroic film 20, which can help avoid delamination during subsequent steps or uses.

In addition, an autoclave often uses a longer cool-down time, which can prevent radius bowing that can sometimes occur when layers of different thickness (i.e., "unbalanced" lay-ups) cool down at different rates. Further, autoclave-involved processes used herein can include a vacuum step, which allows a manufacturer to remove air from the panel 25(*a-b*), and thus manufacture the panel essentially free of air bubbles. One will appreciate that removal of air using a vacuum step can eliminate the need to pre-texture films or sheets (where the texture surface faces inward toward other layers in the assembly 10), which are often used to remove or avoid air bubbles.

Figure 2B:
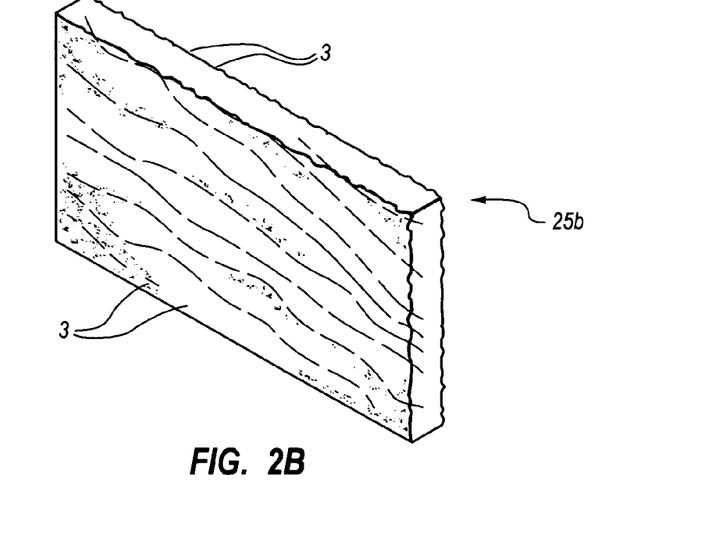
FIG. 2B illustrates a schematic diagram of a formed, dichroic resin panel using the laminate assembly of FIG. 2A.
Figure 3:
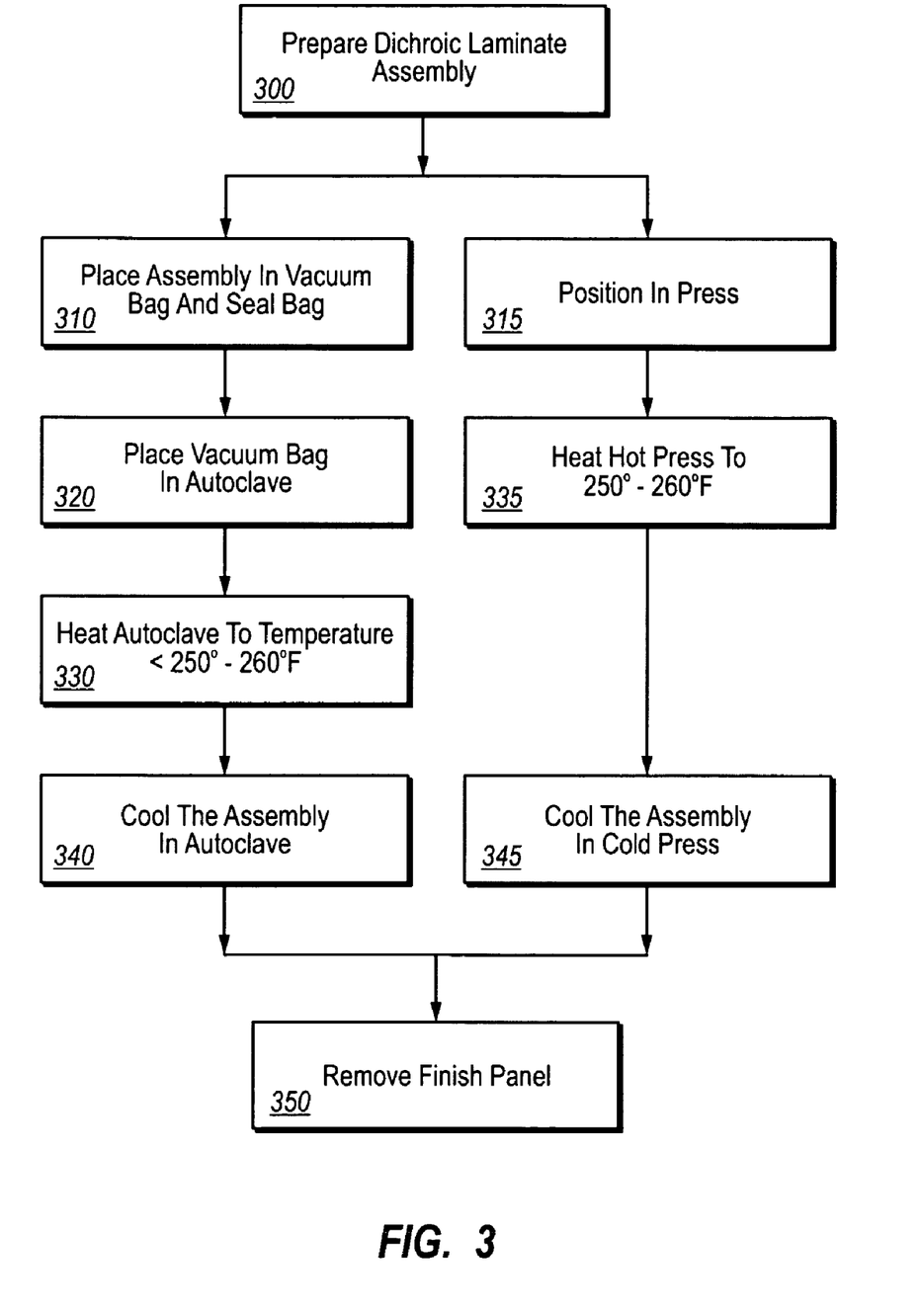
FIG. 3 illustrates a flowchart comprising a plurality of steps in a method for preparing a dichroic resin panel in accordance with an implementation of the present invention.

FIG. 3 illustrates a flowchart for preparing one or more dichroic panels in accordance with an implementation of the present invention. In this case, the flowchart branches with alternate steps to highlight specific implementations of using a specific lamination apparatus such as a hot press or an autoclave to complete the lamination process. The steps illustrated in FIG. 3 are discussed more fully below with respect to the components and assemblies shown in FIGS. 1A-2B.

For example, FIG. 3 shows that a method of preparing a dichroic resin panel 25(*a/b*) that is formable after lamination, contains no air bubbles, and otherwise maintains intended dichroism properties without damage to the dichroic film before, during, or after assembly (e.g., during use), can comprise a step 300 for preparing a laminate assembly (or "dichroic laminate assembly"). For example, FIGS. 1A and 1B show that the manufacturer can prepare a dichroic laminate assembly 10 that comprises a dichroic film 20 (or light refracting film) positioned between a plurality of (at least two opposing) resin substrates 5*a* in a stack formation. The manufacturer can also position one or more tie layers 15 between the dichroic film 20 layer and the resin substrates 5*a*. In at least one implementation, the resin substrates 5*a* comprise a copolyester material, while, in another implementation, the resin substrates 5*a* comprise a polycarbonate or acrylic material, or even mixtures thereof. In general, the choice in substrate 5 material will depend on the intended use of the resulting dichroic resin panel 25(*a/b*).

In addition, and as shown in FIG. 2A, a manufacturer can additionally or alternatively position yet additional resin substrates in the assembly. There might be several different reasons for using multiple resin substrates 5(*a/b*) in a given laminate assembly 10*b*. For example, a manufacturer may desire to create a thicker gauge end-product, and thus each additional resin substrate added to the assembly will ultimately add to the gauge of the end-product.

In additional or alternative implementations, however, the manufacturer might implement these additional resin substrates 5*a* when using substrates with outer surfaces that have already been embossed or textured 3 (e.g., 5*b*). In such a case, since the outer resin substrates 5*b* have already been heat-treated to some extent in order to apply the embossing/texture 3, the outer panel substrates 5*b* may be more sensitive to the additional heat in the laminating process, and thus may bond less favorably to the dichroic film 20 during lamination. To avoid hindering the integrity of the eventual lamination, a manufacturer may be able to stabilize the laminate assembly 10*b* by adding yet additional resin substrates 5*a* (that have not been heat-treated, such as those that are free of embossing or texturing) within the assembly 10*b*.

Specifically, there will tend to be less bonding disparity between resin substrate 5*a* and 5*b*, than otherwise found between dichroic film 20 and substrate 5*b*, even though substrate 5*b* will already have been heat-treated. Thus, for example, FIG. 2B shows a laminate assembly 10*b* comprising opposing outer substrates 5*b* having one or more embosses or textures 3, a plurality of non-embossed or non-textured substrates 5*a* positioned therein, as well as one or more dichroic film layers 20 positioned between the non-textured substrates 5*a*.

FIG. 3 also shows that the manufacturer can then perform one or more alternate steps to cause adhesion between the various layers, depending on whether using an autoclave-involved process, or using a hot press-involved process as the lamination apparatus. For example, steps 310, 320, 330, and 340 relate particularly to autoclave-involved processes, while steps 315, 335, and 345 relate particularly to processes involving a hot press. Referring first to processes involving a hot press, FIG. 3 shows that the method for creating the dichroic resin panel can further comprise a step 315 of positioning the dichroic laminate assembly in a hot press. For example, upon preparing a laminate assembly, such as assembly 10*a* or 10*b* (or the like), the manufacturer then positions the assembly 10(*a/b*) in a hot press. In one implementation, this further involves the manufacturer positioning one or more pressure pads about the assembly 10(*a/b*), placing the assembly on a tray (e.g., an aluminum plate), and positioning the tray within the hot press.

With respect to the hot press, FIG. 3 additionally shows that the method can comprise a step 335 of heating the press to a laminating/adhesion temperature, such as about 250° F. to about 260° F., and a pressure of about 70 psi to about 150 psi, preferably about 90 psi to about 110 psi. Using a TPU tie layer 15, this temperature and pressure range is generally sufficient to melt or soften the various tie layers 15 in the assembly 10, and cause contact-based adhesion. This adhesion will thus occur between the resin substrates 5(a/b) and the dichroic film 20, and/or between the textured resin substrates 5b to the non-textured resin substrates 5a, and so forth. In at least one implementation, the manufacturer maintains this temperature in the hot press for about 10 minutes.

Furthermore, FIG. 3 shows that the method using the hot press can comprise a step 345 of cooling the assembly. For example, after heating the assembly 10(a/b) in the hot press, the manufacturer can then cool the assembly, such as by moving the assembly 10(a/b) to a cool press and holding at a much lower temperature (e.g., about 90° F. to about 110° F., using the same pressure as the hot cycle). In at least one implementation, this also involves the manufacturer applying a texture or embossing to the outer surface of the assembly (e.g., 25(a/b)). For example, the manufacturer can apply texture or embossing paper to either or both outer surfaces of the laminate assembly 10a, and then position the assembly 10a into the cool press. In at least one implementation, the manufacturer applies the texture or embossing paper to both sides of the laminate assembly 10a prior to inserting the laminate assembly 10a into the hot press. In such a case, the texture/embossing paper would already be found in the assembly 10a, and the manufacturer would simply move the entire assembly to the cold press.

By contrast, FIG. 3 shows that the method involving the autoclave can comprise an initial step 310 of placing the dichroic laminate assembly in a vacuum bag and sealing the bag. For example, upon creating the laminate assembly 10a or 10b, the manufacturer positions the assembly in a vacuum bag. In general, the manufacturer will position only one laminate assembly 10(a/b) in any given vacuum bag, though this is not necessarily required. In addition, one will appreciate that an autoclave can typically take many different vacuum bag/laminate assembly combinations (e.g., of 4'×8' sheets) at a time. Thus, a manufacturer will typically prepare a plurality of such assemblies 10 in accordance with the steps 310, 320, 330, and 340.

In addition, and in accordance with step 310, the manufacturer can seal the vacuum bag. In general, the step of sealing the vacuum bag will also involve using a vacuum to remove air from the bag (once sealed). As understood more fully herein, removing air from the vacuum bag is yet another way in which the manufacturer can help ensure that there are no air bubbles in the dichroic resin panel end product. Specifically, removing air from the vacuum bag removes or reduces the chance that such air would otherwise become trapped between assembly layers during lamination (otherwise resulting in air bubbles).

FIG. 3 further shows that the method involving the autoclave can comprise a step 320 of placing the vacuum bag in the autoclave. For example, the manufacturer takes each of the one or more vacuum bags comprising corresponding one or more dichroic laminate assemblies, and positions them in the autoclave. In one implementation, this may involve positioning a plurality of vacuum bags in or on one or more racks, so that several different dichroic laminate assemblies 10 can be processed at the same time.

In addition, FIG. 3 shows that the method involving the autoclave can comprise a step 330 of raising the autoclave to a temperature that is less than about 250° F. to about 260° F. (i.e., a lamination temperature), preferably about 210° F. to about 250° F., more preferably a temperature that is on the low end of this range when using TPU, e.g., about 210° F. to about 230° F., and raising the pressure to about 150 psi to about 170 psi. Specifically, at least one advantage of an autoclave is that, due to the environment created by the autoclave, the autoclave can cause the tie layers 15 to bond at a temperature that is generally lower than that otherwise provided through a hot press. One reason for this is that each vacuum bag can receive additional internal pressure due to air removed from the vacuum bag. Furthermore, the autoclave maintains a bit of a higher and more uniform internal pressure since it is a closed system (unlike most hot presses, which typically apply pressure only directly via platens). Thus, the higher pressures inherent with the autoclave can result in bonding of the laminate assembly 10(a/b) at lower temperatures (i.e., compared with the hot press, or less than 250° F. to 260° F.).

Furthermore, FIG. 3 shows that the method involving the autoclave can comprise yet another step 340 of cooling the assembly. For example, a manufacturer turns off (or down) the temperature of the autoclave, and awaits the cooling to an appropriate temperature (e.g., about 90° F. to about 110° F., maintaining approximately the same pressure used during heating). In general, and as described herein, the autoclave tends to cool at a much slower rate than is otherwise possible using the cold press described above in step 345. In some implementations, this delay in cooling can provide a number of advantages. As described herein, at least one advantage is that the slower cooling helps prevent the bonded layers (i.e., panel 25(a/b)) in the assembly from bowing or delaminating.

Finally, FIG. 3 shows that both the methods for both types of lamination apparatus can include a final step 350 of removing the finished panel. For example, after the laminate assembly(ies) 10(a/b) have cooled sufficiently, the manufacturer can then remove them from the autoclave or from the cold press, as appropriate. As this point, each of the layers in the laminate assembly will have become fully bonded to the next layer in the assembly, such that each laminate assembly 10 will resemble a finished, dichroic resin panel end product 25(a/b). Specifically, the finished panel is a substantially unitary resin panel, with each layer having been bonded to the next adjacent layer to the point the layers are almost indistinguishable from the next.

In addition, and in some implementations, the resulting panel 25(a/b) will still be sufficiently soft that the manufacturer can further form the panel to any number of shapes. For example, the manufacturer can rest a softened panel that has just been cooled down on top of one or more molds into which the given panel will conform. Of course, the manufacturer can perform this forming step within an autoclave, for example, such as during the cooling step (rather than after the cooling step). With respect to using a hot and cold press, the manufacturer would typically rest the resulting product on one or more molds or forms after removing the resin panel from the cold press. In any case, and in light of the materials and processes used herein to bond the substrates 5 about the dichroic film layer 20, however, such forming or molding will not delaminate the panel 25, or otherwise wrinkle or ruin the dichroic film layer 20 embedded inside.

Accordingly, FIGS. 1A-3 and the corresponding text illustrate or describe a number of schematics, components, and mechanisms for preparing or creating an aesthetically pleasing, durable, high-end dichroic panel. These panels created with the materials and mechanisms described herein will not delaminate, do not contain air bubbles, and will maintain the integrity, look, and/or feel of the dichroic film interlayer for as long as the panel 25(*a/b*) is used. These panels are also highly formable, and can thus be used in any number of structural and/or aesthetic applications. Furthermore, since high quality resin materials with excellent aesthetic properties can be used (e.g., translucent/transparent copolyesters, polycarbonate, etc.), the resulting dichroic resin panel end-products can have the same look and quality as glass counterparts, without the same manufacturing/handling difficulties.

The following Examples illustrate the construction and testing of one or more dichroic resin panels using materials, apparatus, and steps in accordance with implementations of the present invention.

Example 1

Textured, dichroic resin panels comprising the following laminate assembly (e.g., 10*a*), shown in Table 1, were prepared as trials.

TABLE 1

| Layer # | Description |
| --- | --- |
| 1 | 0.060" PETG - sandstone-matte finish |
| 2 | 0.025" DUREFLEX A4700 TPU (tie layer) |
| 3 | Dichroic film - 3M CM 500 |
| 4 | 0.025" DUREFLEX A4700 TPU (tie layer) |
| 5 | 0.060" PETG - sandstone-matte finish |

In this example, the assembly in accordance with Table 1 was placed in a hot press. The hot press was then heated to a temperature of from about 250° F. to about 260° F. The assembly was maintained in the hot press at this temperature for about 10 minutes at a pressure of about 70 psi to about 150 psi, preferably about 90 psi to about 110 psi. The assembly was then removed from the hot press and placed in a cool press (reducing temperature to about 90° F. to about 110° F., and using similar pressure as the heating step), along with texture paper (sandstone-matte) on both sides of the assembly in order to apply a matte texture the outer surfaces of the substrates.

After sufficient cooling time in the cool press, the laminate assembly was removed. The bond strength in the overall assembly was deemed sufficient to form a unitary panel (e.g., 25(*a/b*)). In addition, there were no bubbles evident in the tie layers, and no wrinkles in the dichroic film. As such, the laminate assembly in accordance with Table 1 comprised a finished dichroic resin panel (e.g., 25(*a/b*)) with excellent structural and aesthetic properties.

Example 2

Textured, dichroic resin panels comprising the following laminate assembly (e.g., 10*a*), shown in Table 2, were prepared as trials.

TABLE 2

| Layer # | Description |
| --- | --- |
| 1 | 0.500" PETG embossed |
| 2 | 0.025" DUREFLEX A4700 TPU (tie layer) |
| 3 | Dichroic film - CM 500 |
| 4 | 0.025" DUREFLEX A4700 TPU (tie layer) |
| 5 | 0.500" PETG - sandstone finish |

In this example, the prepared laminate assembly in accordance with Table 2 was placed in a hot press. The host press was then heated to a temperature of from about 250° F. to about 260° F., and a pressure of from about 70 psi to about 150 psi, preferably about 90 psi to about 110 psi. The assembly was maintained in the hot press at this temperature and pressure for about 10 minutes. The assembly was then removed and placed in a cool press with an embossing mold to impart an deep embossed texture on the top surface. Further, sandstone-matte texture paper was applied to the back surface to provide a desired surface finish for the flat side of the assembly.

After sufficient cooling time in the cool press, the laminate assembly was removed. The bond strength in the overall assembly was deemed sufficient to form a unitary panel (e.g., 25(*a/b*)). In addition, there were no bubbles evident in the tie layers, and no wrinkles in the dichroic film. As such, the laminate assembly in accordance with Table 2 also comprised a finished dichroic resin panel (e.g., 25(*a/b*)) with excellent structural and aesthetic properties.

Example 3

Textured, dichroic resin panels comprising the following laminate assembly (e.g., 10*a*), shown in Table 3, were prepared as trials.

TABLE 3

| Layer # | Description |
| --- | --- |
| 1 | ⅛" PETG - sandstone-matte finish |
| 2 | 0.025" DUREFLEX A4700 TPU (tie layer) |
| 3 | Dichroic film - CM 500 or CM 592 |
| 4 | 0.025" DUREFLEX A4700 TPU (tie layer) |
| 5 | ⅛" PETG - sandstone-matte finish |

In this case, the laminate assemblies (10*a*) were prepared with full size 4'×8' sheets in the substrate (5*a*) portion. Nevertheless, several different laminate assemblies were prepared with varying thicknesses (e.g., Example 4) and with varying finishes. The assemblies were each positioned in an autoclave at specific times, temperatures, and pressures. One will appreciate that the temperatures used in the autoclave were no higher than from about 250° F. to about 260° F., and, in most cases, were much lower. For example, in one test example, the temperature was raised to between about 210° F. to about 250° F., and the pressure was raised to between about 110 psi to about 170 psi. This temperature and pressure was then maintained for about 90 minutes to effect bonding between layers.

After sufficient cooling (e.g., at about 90° F. to about 110° F., preferably 105° F.) time in the autoclave, the laminate assembly was removed. The bond strength in the overall assembly was deemed sufficient to form a unitary panel (e.g., 25(*a/b*)). In addition, there were no air bubbles, and no wrinkling in the dichroic film 20 within the workable area. As such, the laminate assembly in accordance with Table 3 comprised a finished dichroic resin panel (e.g., 25(*a/b*)) with excellent structural and aesthetic properties.

Example 4

Textured, dichroic resin panels comprising the following laminate assembly (e.g., 10*a*), shown in Table 4, were prepared as trials.

TABLE 4

| Layer # | Description |
|---------|-------------|
| 1 | ⅜" PETG - pre-embossed "Large Tile" |
| 2 | 0.025" DUREFLEX A4700 TPU (tie layer) |
| 3 | 1.15 mils Dichroic film 3M CM 500 |
| 4 | 0.025" DUREFLEX A4700 TPU (tie layer) |
| 5 | ⅛" PETG - textured sandstone paper finish |

As with Example 3, the laminate assemblies (10*a*) of Example 4 were prepared with full size 4'×8' sheets/substrates (5*a*). In addition, the 4'×8' sheets/substrates (5*a*) were prepared with embossed textures prior to creating the assemblies (10*a*).

The assemblies were each positioned in an autoclave at specific times, temperatures, and pressures. As with Example 3, one will appreciate that the temperatures used in the autoclave were no higher than from about 250° F. to about 260° F., and, in most cases, were much lower (e.g., about 210° F. to as much as 250°, using pressure of about 110 psi to about 170 psi). After sufficient cooling time in the autoclave (e.g., at a temperature of about 90° F. to about 110° F., preferably about 105° F., and similar pressure as the heat cycle), the laminate assembly was removed. The bond strength in the overall assembly was deemed sufficient to form a unitary panel (e.g., 25(*a/b*)). In addition, there were no air bubbles, and no wrinkling in the dichroic film 20 within the workable area. Notably, the embossed surface (on the relevant substrate 5*a*) was not lost in the autoclaving process, and there were no visible lines from the vacuum bag on the embossed surface. As such, the laminate assembly in accordance with Table 4 comprised a finished dichroic resin panel (e.g., 25(*a/b*)) with excellent structural and aesthetic properties.

Each of the above-described examples, therefore, result in a dichroic resin panel that represents a significant advantage in the art. Specifically, the dichroic resin panels constructed in line with the materials and mechanisms described herein are sufficiently durable and aesthetic for a wide range of uses. In addition, the materials described herein for the tie layers and the dichroic film do not absorb water. As a result, the dichroic panels (resin or glass) made in accordance with the present invention do not have to be edge sealed in humid or aqueous environments. Furthermore, and as particularly compared with glass counterparts, dichroic resin panels in accordance with the present invention are relatively easy to handle and manufacturer, and also much easier to transport and assemble in this range of uses. Such uses include both interior and exterior applications, even in the presence of stringent building code requiring minimum flammability standards, and/or where the panels may be exposed to relatively severe external elements.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A dichroic resin panel configured with sufficient aesthetic and structural properties for use as a building material in an architectural design environment, the dichroic resin panel comprising:
   a substantially translucent first resin substrate layer having a thickness of about 0.06 inches to about 2.0 inches;
   a substantially translucent second resin substrate layer having a thickness of about 0.06 inches to about 2.0 inches and that corresponds with the first resin layer; and
   one or more light refracting film layers laminated between the first and second resin layers, wherein the one or more light refracting film layers conform to the first and second resin layers without material defect;
   wherein the combination is at least partially malleable after a lamination process.

2. The dichroic resin panel as recited in claim 1, wherein the form of the translucent first and second resin layers is curved.

3. The dichroic resin panel as recited in claim 2, wherein each of the one or more tie layers comprise melted or softened TPU between the one or more light refracting film layers and the first and second resin substrate layers.

4. The dichroic resin panel as recited in claim 2, wherein each of the one or more tie layers comprise softened or melted ethylene-vinyl acetate, or ethyl-methyl acrylate between the one or more light refracting film layers and the first and second resin substrate layers.

5. The dichroic resin panel as recited in claim 2, wherein the one or more tie layers are between about 0.005 and about 0.125 inches thick.

6. The dichroic resin panel as recited in claim 1, further comprising one or more tie layers positioned between the first and second resin layers and about each of one or more the light refracting film layers.

7. The dichroic resin panel as recited in claim 1, wherein one or both of the first or second resin layers is embossed or textured on an outer surface thereof.

8. The dichroic resin panel as recited in claim 7, further comprising one or more additional, non-textured or non-embossed resin substrate layers embedded between the first and second substrate layers.

9. The dichroic resin panel as recited in claim 8, wherein the one or more additional resin substrates are thinner in dimension than the first and second resin substrates.

10. The dichroic resin panel as recited in claim 8, wherein each resin substrate layer in the dichroic resin panel comprises a copolyester material, a polycarbonate material, or combinations thereof.

11. The dichroic resin panel as recited in claim 8, wherein each resin substrate layer in the dichroic resin panel comprises a translucent thermoplastic material including one or more of a polycarbonate styrene material, a polyvinyl chloride material, a polyurethane material, or combinations thereof.

12. A method of manufacturing a post-formable, dichroic resin panel, sufficiently structural for use as a building material in an architectural design environment, comprising a light refracting film, wherein the dichroic resin panel can be modified or formed during or after lamination without cracking, wrinkling, or otherwise distorting the refracting film layer during the manufacturing process, the method comprising the steps of:
   preparing a dichroic laminate assembly comprising one or more light refracting films and one or more tie layers interposed between a plurality of resin substrates, wherein each of the resin substrates has a thickness of about 0.06 inches to about 2.0 inches;

heating the dichroic laminate assembly in a lamination apparatus to a temperature of no more than about 250° F. to about 260° F., wherein the one or more tie layers soften or melt between the plurality of resin substrates;

cooling the dichroic laminate assembly, wherein the dichroic laminate assembly comprises a substantially unitary resin panel; and removing the unitary resin panel from the lamination apparatus.

13. The method as recited in claim 12, wherein the lamination apparatus comprises an autoclave, the method further comprising:

raising the autoclave to a final temperature of between 210° F. to about 250° F.; and raising the pressure of the autoclave to between about 110 psi to about 170 psi.

14. The method as recited in claim 13, further comprising the steps for:

positioning one or more dichroic laminate assemblies in corresponding one or more vacuum bags; and sealing the one or more vacuum bags.

15. The method as recited in claim 14, further comprising the steps of:

cooling the unitary resin panel in the autoclave; and forming the unitary resin panel with one or more curved shapes in the autoclave.

16. The method as recited in claim 12, wherein the lamination apparatus comprises at least a hot press and a cold press, wherein the step for heating the dichroic laminate assembly is performed in the hot press at a temperature of between about 250° F. to about 260° F. using a pressure of between about 70 psi to about 150 psi.

17. The method as recited in claim 16, wherein the step for cooling the dichroic laminate assembly further comprises applying one or more texture or embossing papers to one or more outer surfaces of the dichroic laminate assembly.

18. The method as recited in claim 12, wherein at least two of the plurality of resin substrates in the dichroic laminate assembly comprise a textured or embossed surface that faces away from the one or more light refracting films.

19. The method as recited in claim 18, further comprising positioning one or more additional resin substrates between the at least two resin substrates, wherein the one or more additional resin substrates are free of textured or embossed surfaces.

20. A dichroic laminate assembly configured so that, when subject to a lamination temperature of up to about 250° F. to about 260° F. in an autoclave or hot press, bonds one or more resin substrates to a dichroic film in a manner that preserve the integrity of the dichroic film and prevents the resulting dichroic resin panel from delamination, comprising:

a plurality of resin substrates having a total thickness of about 0.12 inches to about 4.0 inches, comprising one of a copolyester material, a polycarbonate material, or a mixture thereof;

one or more light refracting films positioned between the plurality of resin substrates in a stack formation; and a plurality of TPU tie layers positioned between the plurality of resin substrates in the stack formation;

wherein:

each TPU tie layer is positioned against at least one surface of each of the resin substrates; and each of the one or more light refracting films is positioned adjacent two TPU tie layers on opposing sides.

* * * * *

UNITED STATES PATENT AND TRADEMARK OFFICE
CERTIFICATE OF CORRECTION

PATENT NO. : 7,940,459 B2
APPLICATION NO. : 12/064936
DATED : May 10, 2011
INVENTOR(S) : Willham et al.

It is certified that error appears in the above-identified patent and that said Letters Patent is hereby corrected as shown below:

Column 1
Line 31, change "this these" to --these--

Column 7
Line 24, change "implementations" to --implementation--

Column 11
Line 40, change "texture the outer" to --texture to the outer--

Column 12
Line 2, change "host press" to --hot press--
Line 9, change "an deep" to --a deep--

Column 13
Line 54, change "manufacturer" to --manufacture--

Column 14
Line 35, change "more the" to --more--

Column 16
Line 17, change "preserve" to --preserves--

Signed and Sealed this
Twenty-seventh Day of September, 2011

David J. Kappos
*Director of the United States Patent and Trademark Office*